Patented June 13, 1944

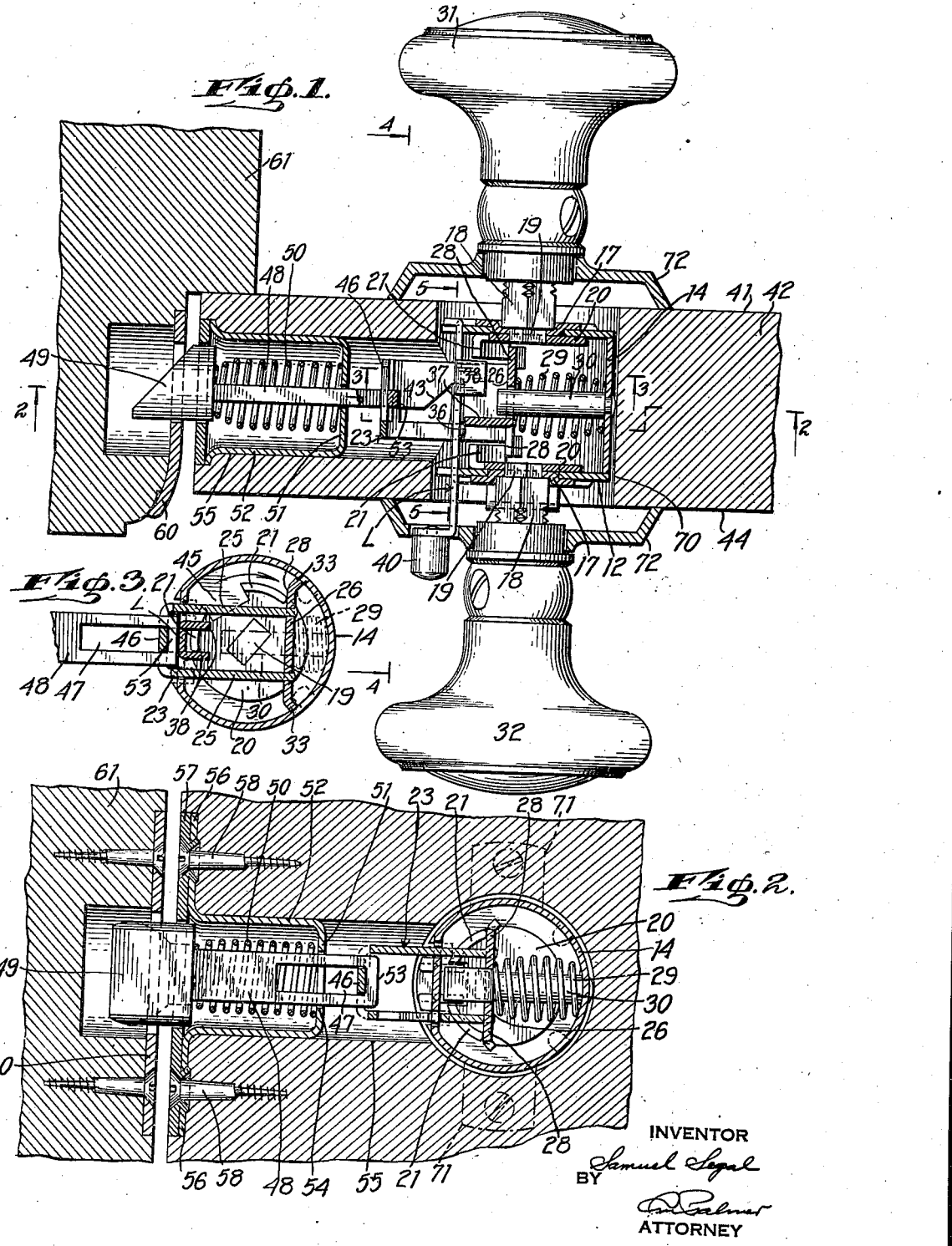

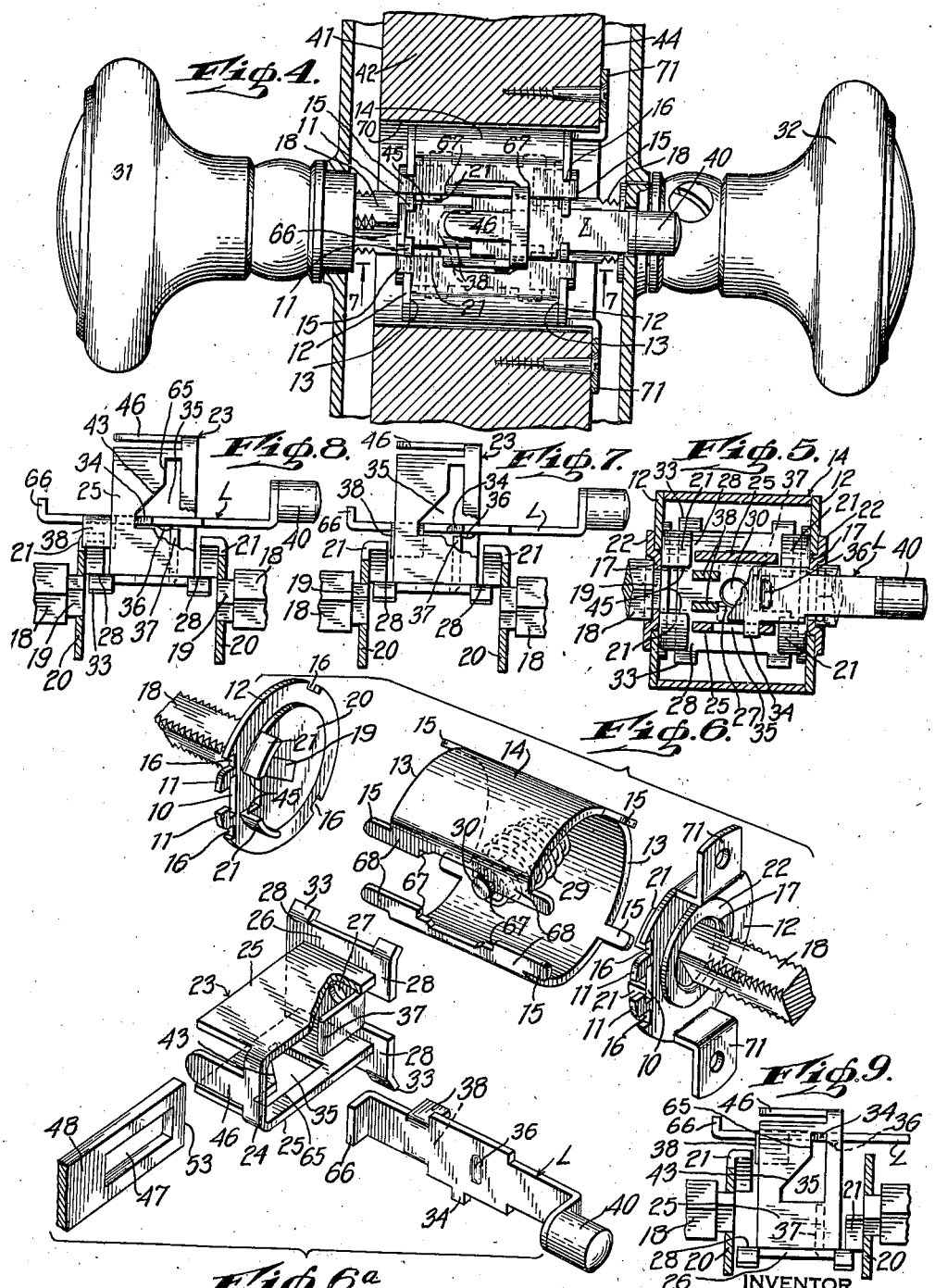

2,351,077

UNITED STATES PATENT OFFICE 2,351,077

TUBULAR LOCK

Samuel Segal, Brooklyn, N. Y.

Application September 5, 1941, Serial No. 409,741

7 Claims. (Cl. 292—169)

This invention is a tubular lock and the objects, features, and functional and structural advantages thereof will be more readily appreciated from a consideration of the following detailed disclosure viewed in the light of the accompanying drawings wherein:

Fig. 1 is a horizontal sectional view of the tubular lock according to my invention.

Fig. 2 is a sectional view on the line 2—2 of Fig. 1.

Fig. 3 is a sectional view on the line 3—3 of Fig. 1.

Fig. 4 is a sectional view taken on the line 4—4 of Fig. 1.

Fig. 5 is a broken sectional view on the line 5—5 of Fig. 1.

Figs. 6 and 6ª are perspective views of the tubular lock and the bolt operating mechanism.

Fig. 7 is a view on the line 7—7 of Fig. 4 illustrating the latch unlocked in respect to the spindle of the outside knob.

Fig. 8 is a view similar to Fig. 7 but illustrating the latch locked relative to the spindle of the outside knob, and Fig. 9 is a view illustrating the driven position of the slidable latch on the rotation of the spindle of the inside knob.

According to the invention the latch L is slidably guided in slots 10 (Fig. 6) defined by retaining lugs 11 and the disc shaped end closure members 12 held against the end faces 13 of the tubular lock casing 14, the retaining lugs 15 fitting closely in and beyond the cooperating notches 16, the retaining lugs 15 being turned down against the disc shaped end members 12 (Fig. 4) to firmly hold the latter against the end faces 13.

Rotatably journalled in the disc shaped closure members 12 are the bearings 17 having extending therefrom the threaded stub shafts or spindles 18 each provided with a non-circular terminal 19 each having fixed thereon an actuating disc 20 having spaced and arcuate lugs or wings 21, the arrangement being such that discs 20 and flanges 22 of the bearings 17 rotatably and closely straddle the closure discs 12 at both ends of the casing 14. Thus if a stub shaft or spindle 18 be rotated, the companion bearing 17 and actuating disc 20 thereof are bodily rotated as is well apparent.

Projecting in part within and in part outside of the casing is the bolt actuating means broadly denoted 23 comprising the channel-shaped or U-shaped member 24 (Fig. 6ª) having its spaced sides 25 fixed to the bridging plate 26 having aperture 27 and the spaced abutment shoulders 28, the bridging plate 26 being normally yieldingly retained against arcuate lugs 21 (Figs. 7 and 8) by the helicoidal normally expandible spring 29 surrounding the fixed pin 30 carried by casing 14, the aperture 27 receiving pin 30 thus movably guiding the bolt actuating means 23 relative to the casing.

The spaced lugs 21 apart from serving as stop means for the bolt actuating means 23 also are selectively utilized to move the latter bodily towards the interior of the casing. For example in Fig. 3 the disc 20, controlled upon the rotation of the outside knob 31, has been rotated in a clockwise direction as indicated by the arrow. Thus the right hand arcuate flange or wing 21 has displaced the bolt actuating means inwardly of the casing and is shown abutting one of the shoulders 28 of the slidably guided plate 26 causing the compression of the spring 29. A similar situation would take place if the outside knob 31 were rotated in a counterclockwise direction in which instance arcuate lug 21 shown in Fig. 3 as idling would be the actuating means cooperating with an adjacent shoulder 28 of the plate 26 for depressing the latter as is well understood.

The inside knob 32 fastened to its companion stub shaft 18 if rotated in either direction obviously causes one of the actuating lugs 21 of the associated driven disc 20 to bodily shift the bolt actuating means 23 towards the interior of the casing. Once however manual pressure is removed from either of the knobs the latter return to their normal positions due to the expansion of the spring 29. However inward displacement of plate 26 is limited by the coaction of the marginal and inclined lips 33 with the interior of the casing.

As previously stated the locking latch or trigger L is slidable or reciprocable longitudinally of the tubular casing 14, being in part arranged between the spaced sides 25 of the channel-shaped member 24. This latch is provided with projection 34 disposed in the irregularly shaped opening or cam slot 35 in one of the sides 25. The latch is in the form of an elongated bar having the struck out detent 36 adapted to cooperate with tongue or lug 37 extending between sides 25 and projecting from plate 26, the detent 36 and tongue 37 characterizing means to prevent accidental displacement of the latch bar L from its latch position shown in Fig. 8 to its unlatched position illustrated in Fig. 7 and vice versa.

Depending from the reciprocable latching bar L are the spaced locking or latching lugs or tongues 38. Where the latching bar is in an unlatched relation these lugs 38 (Figs. 5 and 7) are out of gap 45 and are free and clear of the arcuate lugs or wings 21 associated with the spindle or rotatable stub shaft 18 of the outside knob 31. Thus in Figs. 5 and 7 the outside spindle 18 at the left of the drawings may be rotated in either direction, hence causing the depression or slidable displacement of the bolt actuating mechanism 23.

Where the latching lugs 38 (Fig. 8) are interposed between the rotatable wings 21 at the left hand of Fig. 8, an interlocking relation is set up, thus precluding the rotation of disc 20 and consequently the outside shaft 18, that is, the shaft associated with the outside knob 31. In such relation the latch may be considered in a locking or latching position with the actuating disc 20 controlled by the outside knob 31.

The latch or dog L includes the fixed manipulator or button 40 positioned adjacent the inside knob 32. If this button is pushed in a direction towards the outside face 41 of door 42, detent 36 (Fig. 7) snaps over and by the resilient metal tongue 37 of the sheet metal bolt actuating means 23, thus positioning the spaced tongues 38 between the arcuate wings 21 controlled by the spindle 18 of the outside knob 31, thus the latter cannot be rotated.

To remove the interlocking relation between the latch L and the control means 21 associated with the spindle of the outside knob, positive means in the form of a cam 43 has been provided to actuate projection 34 for bodily and rectilinearly shifting the latch from the position shown in Fig. 8 to the position illustrated in Fig. 7, that is, even though the latch is interlocked or operatively latched to the outside spindle, the latter cannot be rotated, but the control means 21 associated with the spindle 18 of the inside knob however is free and can be rotated by actuating this inside knob. Therefore if the latter is operated and the latch is operatively interlocked with the ouside spindle, cam 43 is depressed or moved inwardly of the tubular casing 14, thus moving the projection 34 and consequently the latch bar L in a direction towards the inside face 44 of the door 42. By this action the latching lugs 38 formerly between the wings 21 controlled by the outside spindle are withdrawn from the gap 45 defined by these wings. Pursuant to the removal of lugs 38 from gap 45, the ouside knob can be rotated.

The bolt actuating means 23 is provided with a hook 46 threaded through opening 47 of shank 48 of the bolt 49. A helicoidal spring 50 is interposed between the bolt 49 and wall 51 of cup 52 and acts to hold bridge 53 of the shank 48 yieldingly against the hook 46, the shank 48 being reciprocably guided in opening 54 in wall 51 of the cup and longitudinally of the latter. The cup 52 is cylindrical and is retained in the cylindrical bore 55 disposed within and longitudinally of the door. For firmly holding cup or socket 52 in bore 55, the lugs 56 of the cup together with a retaining plate 57 through which the bolt 49 moves are secured within the transverse end of the door by the screws 58.

In Figs. 1 and 2 the reciprocably guided bolt 49 is in an interlocking relation with keeper plate 60 fastened to the door jamb or frame 61. In this relation of course, the door is retained against swinging away from the jamb until the bolt is removed from the keeper plate 60.

With the latch L in the position indicated in Fig. 1, the lugs 38 thereof are free and clear of the rotatable wings 21 of the spindle on which the outside knob 31 is mounted, that is, these wings are out of gap 45. Thus rotation of knob 31 in either direction causes retraction of the bolt operating means 23 towards the interior of the tubular casing 14, effecting the withdrawal of the bolt 49 from the keeper plate 60. It follows that the door may then be swung open. Since the latch L as shown in Fig. 1 is unlocked in respect to the outside knob, it may be said that either of the knobs may be actuated to effect an unlocking relation of the bolt. However pursuant to the removal of manual pressure from either of the knobs regardless of their direction or rotation about their spindle axis, the bolt operating means 23 automatically moves outwardly due to the expansion of spring 29 and the bolt 49 is shifted to project beyond the door, due to the action of the spring 50.

In certain instances where a person is within a room and desires to preclude the effective operation of the outside knob 31, the latter as previously mentioned is rendered ineffective by shifting the button or manipulator 40 towards the outside knob, namely shifted from the position indicated in Fig. 7 to its location shown in Fig. 8. Consequently the spaced tongues 38 are confined in gap 45 between the wings 21 of the disc 20 controlled upon rotation of the outside knob, thus preventing rotation of the latter and hence the outside knob cannot be effectively operated from the outside face of the door. However the outside knob 31, if latched against rotation can be unlocked from the latch automatically by merely rotating the inside knob 32 in either direction Such action causes the movement of the bolt control means 23 inwardly of the tubular casing 14, thus cam 43 actuates tongue 34 and consequently lugs 38 are moved clear out of the gap 45 and detent 36 snaps over tongue 37 which resist displacement of the latch in a direction towards the spindle 18 of the outside knob 31. After cam 43 drives tongue 34 and consequently the latch L towards the spindle of the inside knob on rotation of the latter, the bolt operating means 23 thereafter is further moved inwardly of the casing 14 whereby tongue 34 is idly received in the slot 65 (Fig. 9) of the opening 35 at which time lug 66 of the latch L is against the lugs 11 of the closure disc 12 surrounding the spindle of the outside knob 31. During the reciprocable movement of the bolt operating means 23 the sides 25 are also guided by walls of the notches 67 in the alined flanges 68 of casing 14, which is sustained in the transverse bore 70 of the door while one of the end closure discs 12 of the casing includes ears 71 fastened to the door. Shields 72 are appropriately retained against the inner and outer faces of the door and are utilized to act as bearings for the knobs 31 and 32 appropriately anchored to the spindles 18.

Various changes may be made in the details of construction and arrangement of parts without departing from the spirit of the invention or sacrificing any of the advantages thereof inherent therein.

I claim:

1. A tubular lock mounted on a door and controlled by an outside rotatable knob and spindle and by an inside rotatable knob and spindle for withdrawing a slidable bolt from a keeper secured to the jamb of said door; said lock comprising a casing, rotatable control means carried by said casing and comprising spaced wings defining a gap therebetween and adapted to be actuated by said outside knob and spindle, rotatable control means carried by said casing and adapted to be actuated by said inside knob and spindle, a slidable latch mounted on said casing and extending in advance of the inside face of said door and having projecting means and a projection, spring controlled slidably guided bolt operating means connected to said bolt and severally actuated by either of said control means and comprising a hollow member having spaced sides one of which includes a cam slot receiving said projection, said latch adapted to be manually shifted towards the outside of said door to arrange said projecting means in said gap to interlock with said wings to prevent rotation of said outside knob, said cam slot having a side cooperating with said projection upon rotation of said inside knob to automatically and bodily shift said latch in a direction away from said outside face to remove said projecting means out of interlocking relation with said wings to permit rotation of said outside knob, a tongue projecting from said bolt operating means, and detent means on said latch cooperating with said tongue to resist accidental longitudinal displacement of said latch to prevent said projecting means to interlock with said wings if unlocked therefrom and to prevent unlocking of said projecting means from said wings if interlocked therewith.

2. A tubular lock mounted on a door and controlled by an outside rotatable knob and spindle and by an inside rotatable knob and spindle for withdrawing a slidable bolt from a keeper secured to the jamb of said door; said lock comprising a casing, rotatable control means carried by said casing and comprising spaced wings defining a gap therebetween and adapted to be actuated by said outside knob and spindle, rotatable control means carried by said casing and adapted to be actuated by said inside knob and spindle, a slidable latch mounted on said casing and extending beyond the inside face of said door and having projecting means and a projection, spring controlled slidably guided bolt operating means connected to said bolt and severally actuated by either of said control means and comprising a hollow member having spaced sides one of which includes a cam slot receiving said projection, said latch adapted to be manually shifted towards the outside face of said door to arrange said projecting means in said gap to interlock with said wings to prevent rotation of said outside knob, said cam slot having an inclined side cooperating with said projection upon rotation of said inside knob to automatically and bodily shift said latch in a direction away from said outside face to remove said projecting means out of interlocking relation with said wings to permit rotation of said outside knob, a tongue projecting from said bolt operating means, and detent means on said latch cooperating with said tongue to resist accidental longitudinal displacement of said latch to prevent said projecting means to interlock with said wings if unlocked therefrom and to prevent unlocking of said projecting means from said wings if interlocked therewith.

3. A tubular lock mounted on a door and controlled by an outside rotatable knob and spindle and by an inside rotatable knob and spindle for withdrawing a slidable bolt from a keeper secured to the jamb of said door; said lock comprising a casing, rotatable control means carried by said casing and comprising spaced wings defining a gap therebetween and adapted to be actuated by said outside knob and spindle, rotatable control means carried by said casing and adapted to be actuated by said inside knob and spindle, a slidable latch mounted on said casing and having spaced lugs and a projection, spring controlled slidably guided bolt operating means connected to said bolt and severally actuated by either of said control means and comprising a hollow member having spaced sides one of which includes a cam slot receiving and movably guiding said projection, said latch adapted to be manually shifted towards the outside face of said door to arrange said spaced lugs in said gap to removably interlock with said wings to prevent rotation of said outside knob, said cam slot having an inclined side cooperating with said projection upon rotation of said inside knob to automatically and bodily shift said latch in a direction away from said outside face to remove said spaced lugs out of interlocking relation with said wings to permit rotation of said outside knob, a tongue projecting from said bolt operating means, and detent means on said latch cooperating with said tongue to resist accidental longitudinal displacement of said latch to prevent said projecting means to interlock with said wings if unlocked therefrom and to prevent unlocking of said projecting means from said wings if interlocked therewith.

4. A tubular lock adapted to be mounted on a door and controlled by an outside rotatable knob and spindle and by an inside rotatable knob and spindle for withdrawing a slidable bolt from a keeper secured to the jamb of said door; said lock comprising a casing, rotatable control means having spaced portions defining a gap therebetween and adapted to be actuated by said outside knob and spindle, rotatable control means adapted to be actuated by said inside knob and spindle, a slidable latch mounted on said casing and having spaced lugs and a projection, displaceable bolt operating means connected to said bolt and having a bridge movably guided and resiliently sustained within said casing and severally actuated by either of said control means for actuating said bolt operating means to project said bolt into and out of said keeper, means extending from said bridge comprising an opening receiving said projection and including an inclined wall and a clearing guide slot extending from said wall and communicating with said opening, said latch adapted to be manually shifted towards the outside of said door to arrange said lugs in said gap to interlock with said control means adapted to be actuated by said outside spindle and knob to prevent rotation of the latter and to arrange said projection adjacent one end of said inclined wall, said wall upon rotation of said inside knob to depress said bridge inwardly of said casing cooperating to shift said latch in a direction away from said outside face to remove said lugs out of interlocking relation with said control means adapted to be actuated by said outside knob to permit rotation of the latter and to arrange said projection in alinement with said clearing slot to be removably received by the latter on displacement of said bridge by either of said control means.

5. A tubular lock adapted to be mounted on a door and controlled by an outside rotatable knob and spindle and by an inside rotatable knob and spindle for withdrawing a slidable bolt from a keeper secured to the jamb of said door; said lock comprising a casing, rotatable control means having spaced portions defining a gap therebetween and adapted to be actuated by said outside knob and spindle, rotatable control means adapted to be actuated by said inside knob and spindle, a slidable latch mounted on said casing and having spaced lugs and a projection, displaceable bolt operating means connected to said bolt and having a bridge guided and resiliently sustained within said casing and severally actuated by either of said control means for actuating said bolt operating means to project said bolt into and out of said keeper, a channel shaped member extending from said bridge comprising spaced sides one of which embodies an opening receiving said projection and including an inclined wall and a clearing guide slot extending from said wall and communicating with said opening, said latch adapted to be manually shifted towards the outside face of said door to arrange said lugs in said gap to interlock with said control means adapted to be actuated by said outside spindle and knob to prevent rotation of the latter and to arrange said projection adjacent one end of said inclined wall, said wall upon rotation of said inside knob to depress said bridge inwardly of said casing cooperating to shift said latch in a direction away from said outside face to remove said lugs out of interlocking relation with said control means adapted to be actuated by said outside knob to permit rotation of the latter and to arrange said projection in alinement with said clearing slot to be removably received by the latter on displacement of said bridge by either of said control means.

6. A tubular lock adapted to be mounted on a door and controlled by an outside rotatable knob and spindle and by an inside rotatable knob and spindle for withdrawing a slidable bolt from a keeper secured to the jamb of said door; said lock comprising a casing having spaced portions, rotatable control means having spaced portions defining a gap therebetween and adapted to be actuated by said outside knob and spindle, rotatable control means adapted to be actuated by said inside knob and spindle, a slidable latch mounted on said casing and having spaced lugs and a projection, displaceable bolt operating means connected to said bolt and having a bridge interposed between said spaced portions of said casing and movably guided and resiliently sustained within said casing and severally actuated by either of said control means for actuating said bolt operating means to project said bolt into and out of said keeper, means extending from said bridge comprising an opening receiving said projection and including an inclined wall and a clearing guide slot extending from said wall and communicating with said opening, said latch adapted to be manually shifted towards the outside face of said door to arrange said lugs in said gap to interlock with said control means adapted to be actuated by said outside spindle and knob to prevent rotation of the latter and to arrange said projection adjacent one end of said inclined wall, said wall upon rotation of said inside knob to depress said bridge inwardly of said casing cooperating to shift said latch in a direction away from said outside face to remove said lugs out of interlocking relation with said control means adapted to be actuated by said outside knob to permit rotation of the latter and to arrange said projection in alinement with said clearing slot to be removably received by the latter on displacement of said bridge by either of said control means.

7. A tubular lock adapted to be mounted on a door and controlled by an outside rotatable knob and spindle and by an inside rotatable knob and spindle for withdrawing a slidable bolt from a keeper secured to the jamb of said door; said lock comprising a casing having spaced portions, rotatable control means having spaced portions defining a gap therebetween and adapted to be actuated by said outside knob and spindle, rotatable control means adapted to be actuated by said inside knob and spindle, a slidable latch mounted on said casing and having spaced lugs and a projection, displaceable bolt operating means connected to said bolt and having a bridge interposed between and under said spaced portions of said casing and movably guided and resiliently sustained within said casing and severally actuated by either of said control means for actuating said bolt operating means to project said bolt into and out of said keeper, means extending from said bridge comprising an opening receiving said projection and including an inclined wall and a clearing guide slot extending from said wall and communicating with said opening, said latch adapted to be manually shifted towards the outside face of said door to arrange said lugs in said gap to interlock with said control means adapted to be actuated by said outside spindle and knob to prevent rotation of the latter and to arrange said projection adjacent one end of said inclined wall, said wall upon rotation of said inside knob to depress said bridge inwardly of said casing and away from said spaced portions thereof cooperating to shift said latch in a direction away from said outside face to remove said lugs out of interlocking relation with said control means adapted to be actuated by said outside knob to permit rotation of the latter and to arrange said projection in alinement with said clearing slot to be removably received by the latter on displacement of said bridge by either of said control means, a tongue projecting from said bridge, and detent means cooperating with said tongue to resist accidental displacement of said latch.

SAMUEL SEGAL.